United States Patent
Reynolds

(10) Patent No.: US 11,731,890 B2
(45) Date of Patent: Aug. 22, 2023

(54) SEPTIC SYSTEM WITH IMPROVED PROCESSING EFFICIENCY, AND METHOD OF OPERATION

(71) Applicant: Todd Reynolds, Eastsound, WA (US)

(72) Inventor: Todd Reynolds, Eastsound, WA (US)

( * ) Notice: Subject to any disclaimer, the term of this patent is extended or adjusted under 35 U.S.C. 154(b) by 121 days.

(21) Appl. No.: 17/227,659

(22) Filed: Apr. 12, 2021

(65) Prior Publication Data

US 2021/0387880 A1    Dec. 16, 2021

Related U.S. Application Data

(60) Provisional application No. 63/037,529, filed on Jun. 10, 2020.

(51) Int. Cl.
*C02F 3/28* (2023.01)
*C02F 3/12* (2023.01)
*E03F 1/00* (2006.01)
*C02F 103/00* (2006.01)

(52) U.S. Cl.
CPC ............ *C02F 3/288* (2013.01); *C02F 3/1221* (2013.01); *E03F 1/005* (2013.01); *C02F 2103/005* (2013.01); *C02F 2301/046* (2013.01)

(58) Field of Classification Search
CPC .......... C02F 3/1242; C02F 3/288; C02F 3/06; C02F 2103/002; C02F 2103/005; C02F 3/1221; E01F 1/005

USPC ............................................... 210/629, 532.2
See application file for complete search history.

(56) References Cited

U.S. PATENT DOCUMENTS

| | | | | |
|---|---|---|---|---|
| 5,620,602 A | * | 4/1997 | Stuth ........................ | C02F 3/04 210/615 |
| 6,331,249 B1 | * | 12/2001 | Nelson .................... | C02F 3/302 210/906 |
| 2014/0076788 A1 | * | 3/2014 | Miyata ..................... | C02F 3/04 210/138 |
| 2015/0239761 A1 | * | 8/2015 | Smith ...................... | C05F 7/00 210/631 |

* cited by examiner

*Primary Examiner* — Claire A Norris

(57) ABSTRACT

A septic system is provided that includes a septic tank having a plurality of compartments with a tank inlet in a first compartment. First and second vaults are positioned in a second compartment. The first vault receives fluid from the first compartment at a level near a fluid surface in the tank. A first flow inducer receives fluid from the first vault at a level near a bottom of the first vault, and releases fluid into the second compartment at a level near the fluid surface. The second vault receives fluid from the second compartment at a level near a bottom of the second vault and discharge fluid at a level near the fluid surface. Third and fourth vaults and a second flow inducer are positioned in a third compartment, the third vault receiving fluid from the second vault, and the fourth vault discharging fluid to a tank outlet.

25 Claims, 5 Drawing Sheets

SEPTIC SYSTEM WITH IMPROVED PROCESSING EFFICIENCY, AND METHOD OF OPERATION

CROSS-REFERENCE TO RELATED APPLICATION

This application claims the benefit of Provisional Patent Application Ser. No. 63/037,529, filed Jun. 10, 2020, which application is incorporated herein by reference in its entirety.

BACKGROUND

Field of the Invention

The present invention relates generally to septic systems, and, more particularly, to septic tanks of on-site sewage systems.

Related Art

On-site sewage systems (OSS), more commonly referred to as septic systems, are in common use in many countries, including the U.S. and Canada, particularly in locations where municipal sewage collection systems are not accessible. For example, many rural and even suburban businesses and residences employ septic systems to collect and treat their sewage on site. A typical septic system includes a septic tank for pretreatment and a drainfield for final treatment and disposal, and in some cases may include other elements, as necessary. Such systems are very well known and understood. The present disclosure is directed primarily to the septic tank portion of such systems.

FIG. 1 is a perspective view of a typical septic tank 100 according to known art, with one side cut away, and a top, or lid, not shown. The septic tank 100 can be made of any of a number of materials, including, e.g., concrete, fiberglass, polyethylene, etc. The tank 100 has bottom and side walls 102 and a central baffle 104 that separates the tank 100 into a first compartment 106 and a second compartment 108. The first compartment 106 typically occupies about two thirds of the total volume of the tank 100 while the second compartment 108 occupies the remaining third. The tank 100 further includes a tank inlet 110 through a side wall 102, an inlet baffle 112, a tank outlet 114 through another side wall, an outlet baffle 116, and a center passage 118 that extends through the central baffle 104.

During normal operation, once the tank 100 has filled and is in regular use, a fluid surface level 119 in the septic tank 100 remains at a depth corresponding primarily to the position of the outlet 114. Influent (untreated wastewater from a residence or other waste producer) enters the first compartment 106 via the tank inlet 110. The inlet baffle 112 directs incoming wastewater into the first compartment 106 at a depth that is well below the fluid surface level 119. As influent enters the tank inlet 102 in the first compartment 106, an equal volume of fluid passes from the first compartment to the second compartment 108, via the center passage 118, and an equal volume of effluent (treated wastewater) exits the tank 100 from the second compartment, via the tank outlet 114. Typically, the effluent is then piped to a drainfield, according to well known processes.

The inlet, outlet, and central baffles 112, 116, 104 are designed to minimize agitation of fluid in the tank 100 as fluid passes through the tank, to permit the fluid to separate according to the density of its constituents. As the wastewater gradually separates, heavier solids sink to the bottom of the tank 100 to form a layer of sludge 120, and lighter solids, such as grease, fats, paper, etc. rise to the top to form a layer of scum 122 on the surface, leaving a relatively clear central layer of fluid between. The center passage 118 is positioned in the central baffle 104 to permit fluid from the clear central layer to pass from the first compartment 106 to the second compartment 108 while trapping most of the solid material in the sludge and scum layers 120, 122 in the first compartment. Aerobic and anaerobic bacteria work to decompose solids and other organic materials in each of the layers into constituent components. Additional components are sometimes provided, to improve performance of a septic system, such as, for example, a recirculation pump configured to return a portion of the wastewater from the second compartment 108 to the first compartment 106. This adds oxygen to the fluid as it is transported, which increases the activity of the aerobic bacteria in the first compartment 106, improving the overall performance of the tank. Additionally, in some cases a filter or biofilter is also provided. The recirculation pump is configured to recirculate the wastewater through the filter prior to returning the fluid to the tank.

Many municipalities monitor or regulate the operation of septic systems, or otherwise impose specific standards and limitations on their use. Such standards vary from one municipality to another, but they are widely recognized and understood within the industry.

For example, in the state of Washington, in the U.S., the Washington State Department of Health (Wash DOH) is tasked with the responsibility to regulate the operation of sewage systems used in the state in order to control or prevent adverse environmental impact and protect the public from contamination of the groundwater and municipal water supplies. Among other regulations, in order for a manufacturer to sell or install a proprietary sewage treatment product within the state, the product must be subjected to operational tests and assigned a performance level (A-E and N) according to the performance of the product in several parameters. For any given location within the state, Wash DOH determines a minimum performance level that must be met by any product used at that location, depending upon the local sensitivity to contamination or the potential harm that might arise from such contamination. Thus, a product that demonstrates a higher level of performance can be used in a broader range of locations and environments than a less effective product.

In some cases, if a septic tank cannot meet the performance levels required for a particular location, secondary treatment becomes necessary before the effluent can be sent to a drainfield. Some common secondary treatment systems are briefly discussed in the disclosure below for comparison with disclosed embodiments.

DETAILED DESCRIPTION

Figure 1:
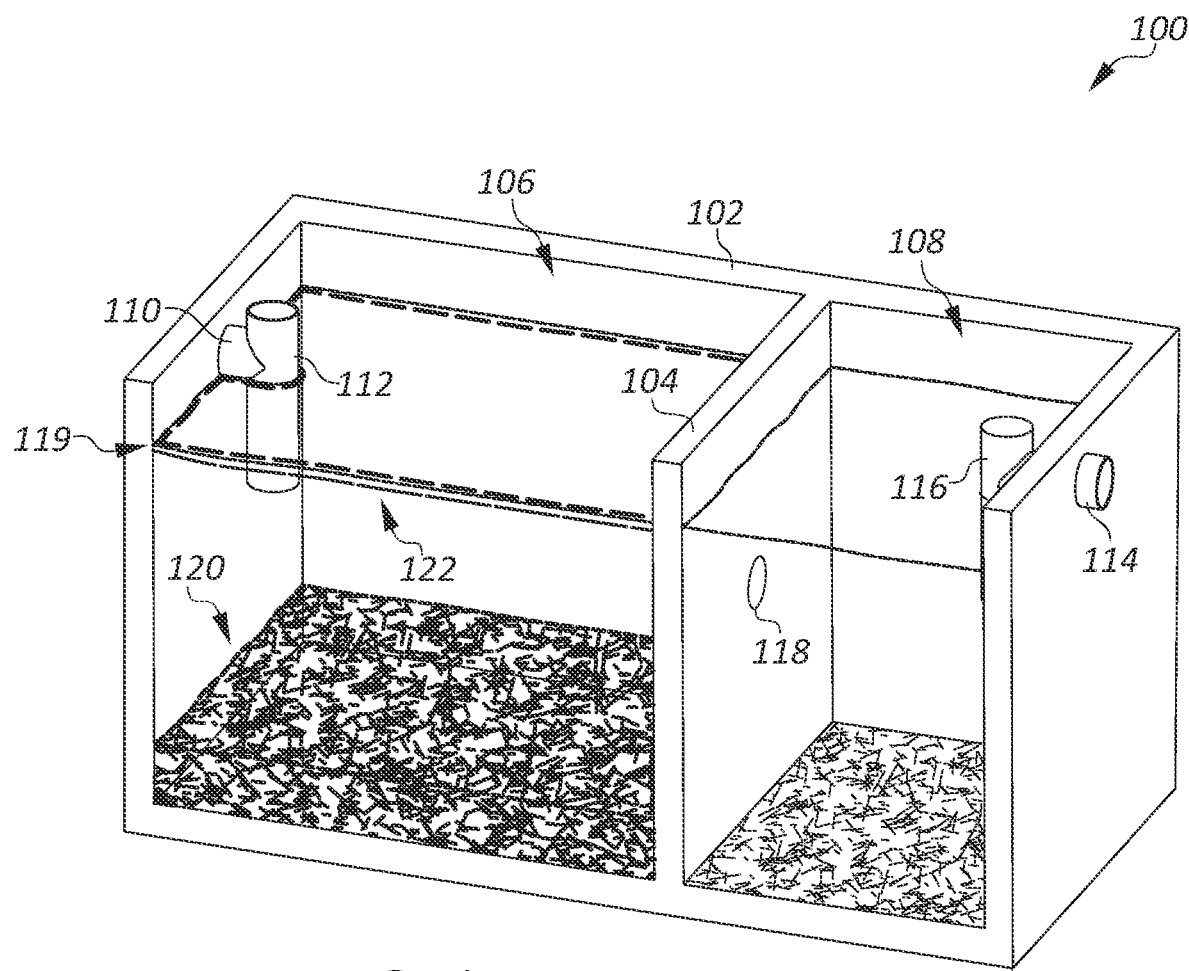
FIG. 1 is a perspective view of a typical septic tank according to known art, with one side cut away, and a top not shown.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

The term fluid surface level, as used in the specification and claims, is to be understood as referring to a surface level of wastewater in a septic system during normal operation of the system. For example, prior to installation and use, or immediately after installation, a prefabricated septic tank will not have any fluid therein, and thus, no fluid surface level. Nevertheless, a person having ordinary skill in the art can determine, from a simple examination of the tank or its components, what the normal operating fluid surface level will be once the system is properly installed and has been in operation for sufficient time for the tank to fill and for the volume of effluent to substantially match that of the influent.

In the specification and claims, terms indicating relative directions or positions, such as top, bottom, upper, lower, upward, downward, etc., are used to refer to locations or movements as they would appear or occur with the system in question positioned and oriented for normal use. Thus, for example, if a claim using such terms can be read on a particular septic tank while the tank is in normal operation, the claim can also be read on the same tank while it is positioned upside down on the back of a truck, or in a manufacturer's facility, etc.

The inventor has recognized that there are some significant problems associated with most conventional septic tanks that impair the efficiency of their operation, and further, that most secondary treatment schemes fail to correct the problems, and even may exacerbate them, resulting in over-complex and expensive systems.

In a conventional septic tank like that shown in FIG. 1, influent wastewater collects oxygen from the ambient air in the sewer pipes and headspace of the tank 100 as it flows into the tank and is delivered to the first compartment 106. Aerobic bacteria uses the oxygen as it works to reduce the organic material in the wastewater, producing nitrogen as one of its byproducts. As the wastewater stands in the tank and the solids settle out, the oxygen is consumed, starving the aerobic bacteria and encouraging the growth of anaerobic bacteria, which continues the decomposition of the organic material while removing free nitrogen from the wastewater. During the course of this nitrification/denitrification process, organics and harmful microorganisms, including coliform bacteria colonies, are removed from the wastewater, so that when the effluent is transmitted to the drainfield, microorganisms in the soil can complete the process of purifying the wastewater before it returns to the groundwater.

Typically, most, or all of the oxygen available to the system is introduced before the influent wastewater is introduced to the first compartment 106 of the septic tank 100. Absorption of additional oxygen at the surface of the fluid in the tank 100 is prevented by the scum layer 122, which forms a cap that seals the surface of the fluid. Even if this were not the case, because the tank is specifically designed to reduce movement and circulation of fluid in the tank, in order to promote settling and separation, oxygen would not be circulated from the upper layer of the fluid to the lower layers. This sharply limits the work that can be performed by aerobic bacteria. This also limits the work of anaerobic bacteria because the work performed by that bacteria relies in part on the byproducts produced by the aerobic bacteria, such as nitrogen, so the work of the anaerobic bacteria is proportional to the work performed by the aerobic bacteria. Therefore, once the oxygen in the wastewater is consumed, very little further treatment is performed. In septic tanks of the type shown in FIG. 1, virtually all of the water treatment occurs in the first compartment, with almost none occurring in the second compartment, because by the time the fluid passes into the second compartment, it is substantially devoid of oxygen.

Of course, if the flow volume of influent increases, so too does the amount of oxygen introduced into the tank, but assuming that the levels of suspended solids and contaminants in the influent remain proportional to the flow, the amount of treatment required will also increase in proportion to the increase in flow, and the level of treatment will not improve significantly.

One approach to improving the performance level of such a tank is to introduce secondary treatment processes. For example, a second—usually smaller—tank piped in series with the first can improve the treatment level but requires additional space and the cost of obtaining and installing the second tank. Another common approach is to pump fluid from the second compartment back to the first, usually through a filter and aeration system. This increases available oxygen, and the filter may provide an environment that is conducive to the growth of aerobic bacteria. However, the inventor has recognized that when fluid is pumped from the second compartment of a conventional septic tank, it draws fluid through the center passage 118, increasing the rate of fluid flow through the system. The increased flow reduces the time during which wastewater in the first compartment can settle and separate, and instead agitates and imparts additional movement to the fluid in the first compartment, further reducing the separation of solids from the wastewater. This can result in an improvement of the biological fluid treatment while simultaneously increasing the level of suspended solids in the effluent at the outlet.

Figure 2:
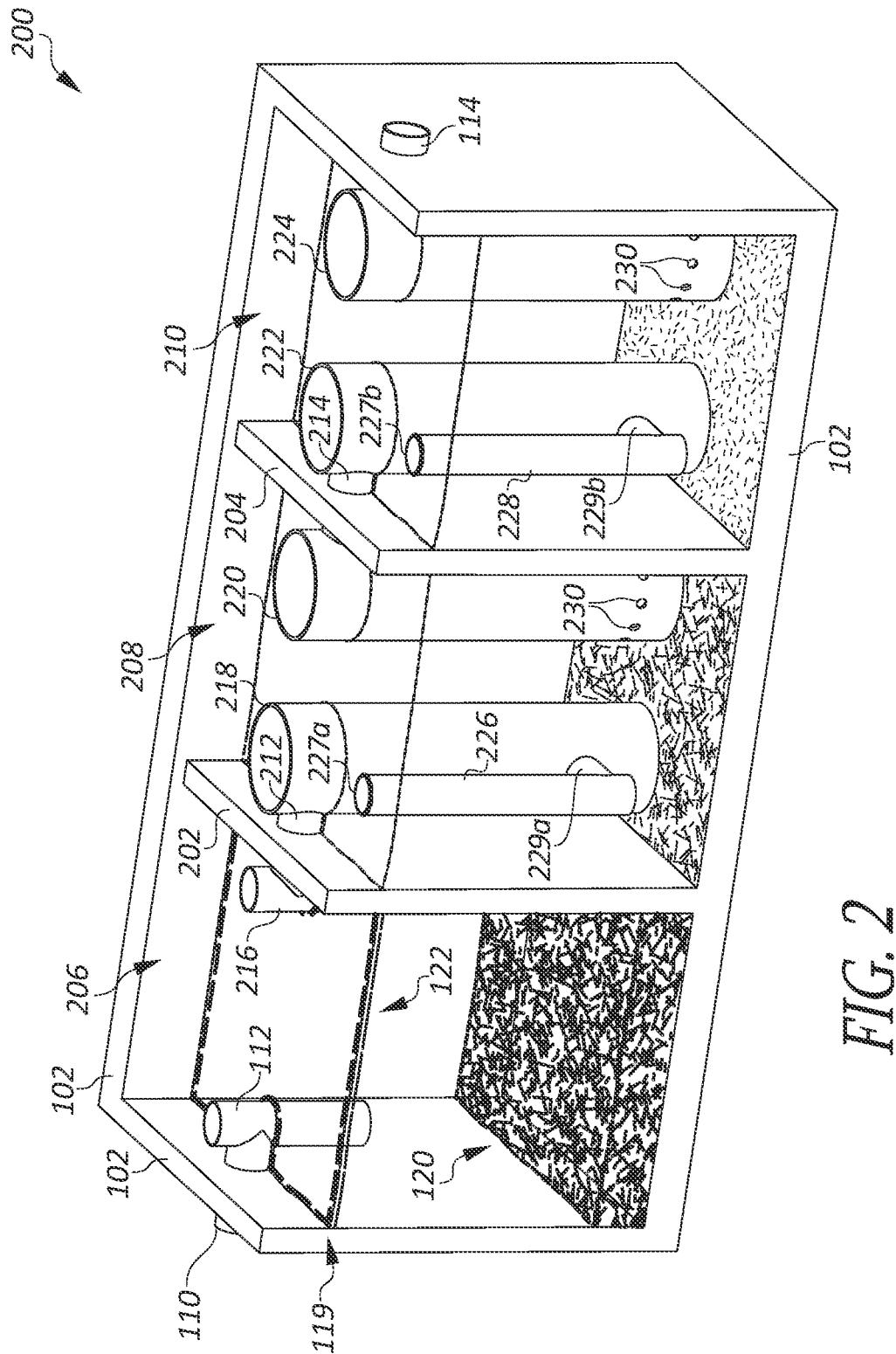
FIG. 2 is a perspective view of a septic tank system according to an embodiment, with the top and one side omitted or cut away to show the interior of the tank.

FIG. 2 is a perspective view of a septic tank system 200 according to an embodiment, with the top and one side omitted or cut away to show the interior of the tank. The septic tank 200 includes bottom and side walls 102, an inlet 110 and inlet baffle, 112, and an outlet 114. Additionally, the septic tank 200 includes first and second interior walls 202, 204 that separate the interior volume of the tank into first, second, and third approximately equally sized compartments 206, 208, 210. First and second pass throughs 212, 214 extend, respectively, through the first and second interior walls 202, 204 at a height—or depth—corresponding to the height of the inlet and outlet 110, 114. The first pass through 212 extends from a pass through-baffle 216 positioned in the first compartment 206 to a first descending-flow vault 218 positioned in the second compartment 208. The second pass through 214 extends from a first ascending-flow vault 220 positioned in the second compartment 208 to a second descending-flow vault 222 positioned in the third compartment 210. A second ascending-flow vault 224 positioned in the third compartment 210 is coupled to an inner end of the outlet 114. A first pair of flow inducers 226 is coupled to the first descending-flow vault 218 via coupling channels 227a and a second pair of flow inducers 228 is coupled to the second descending-flow vault 222 (only one of each pair of flow inducers is visible in FIG. 2, the other being positioned on the side of the respective vault opposite the visible one of the pair) via couplers 227*b*. Each of the flow inducers 226, 228 is closed at a bottom end, and, in the embodiment shown in FIG. 2, is coupled near its bottom end by a short pipe stub—functioning as the corresponding couplers 227—to a point near a bottom end of the corresponding vault, its top end 229 being open and positioned at a height that approximately corresponds to the normal operating fluid surface level 119. Each of the first and second ascending-flow vaults 220, 224 includes a flow inlet 230 positioned near a lower end thereof. In the embodiment of FIG. 2, each of the flow inlets 230 comprises a plurality of apertures distributed around its circumference. Each of the ascending-flow and descending-flow vaults 220, 224, 218, 222 is closed at its bottom end, either by virtue of having been mounted directly to the bottom of the tank or by a respective plate, and open at its top end, which is positioned above the fluid surface level 119.

In the embodiment of FIG. 2, the flow inlets 230 are shown and described as being near a lower end of the respective ascending-flow vault. Even though most of the sludge in the influent settles out in the first compartment 206, some may be carried into the second, or even third compartments, 208, 210. As fluid enters the apertures of the fluid inlets 230, the flow rate will accelerate, which could potentially create some local agitation. By positioning the flow inlets 230 slightly above the bottoms of the vaults, the likelihood that the localized agitation near the inlets will stir up or entrain sludge from the bottom is reduced. On the other hand, the effective length of a passage, such as the first ascending flow vault 220, for example, is determined by the distance between the flow inlet 230*a* and the second pass through 214, and that effective length will influence the amount of biological activity that will occur as wastewater passes therethrough. Thus, it is generally desirable to maximize the effective passage length by positioning the flow inlets 230 as near to the lower end of the respective ascending-flow vault as is practical. In some cases, that position may be at the very bottom of the passage in question, rather than slightly above the bottom. Thus, terms that define a position as being near a particular level or feature, etc., can be read broadly as meaning at or near that level or feature.

Furthermore, a person of ordinary skill in the art will easily understand the meaning of claim terms such as near or corresponding to a reference element, location, or feature, including, for example, an upper or lower end of a particular passage, a fluid surface level, etc., without requiring instructions as to specific or relative distances, Such a person will also understand that where such terms are used, the position of the element being defined, relative to the reference, will influence one or more operating parameter of that element or the overall system, and may influence parameters inversely, so that the selection of the position is a design choice that may involve a compromise between desired characteristics.

Accordingly, the positions, sizes, and shapes of elements such as flow inlets, pass throughs, outlets, etc., are design choices, and will depend upon the configuration and intended use of the particular embodiment, as well as the trade-offs a designer chooses to make. Examples of some of the particular factors that might influence the designer are described in the discussion, above, of the positioning of the flow inlets 230 relative to the bottoms of the ascending-flow vaults 220, 224, and the discussion, below, of the top ends of the flow inducers 226, 228 relative to the fluid surface level 119.

Referring again to the first and second pairs of flow inducers 226, 228, the exact position of their top ends 229, relative to the fluid surface level 119, can be selected according to a desired effect. For example, if the top ends 229*a* of the first pair of flow inducers 226 are positioned slightly above the fluid surface level 119, wastewater exiting the flow inducers will drop from the top ends to the fluid surface level, producing some agitation. This will serve to increase oxygen absorption but will also introduce some turbulence into the wastewater in the second compartment 208. Alternatively, if the top ends 229*a* are positioned slightly below the fluid surface level 119, wastewater will flow more smoothly into the second compartment 208, but because of the lower degree of agitation, oxygen absorption will be reduced, as compared to the higher position. Thus, in selecting the positions of the top ends of the flow inducers, the designer balances a trade-off, between improved oxygenation and reduced turbulence.

The dimensions of the septic tank 200 and its components can vary depending upon factors such as the intended treatment capacity of the tank, constraints imposed by its intended placement and location, availability of materials, etc. According to one embodiment, the tank 200 is about five and a half to six feet deep, five feet wide, and about fifteen feet long, so that each of the first, second, and third compartments 206, 208, 210 is about five feet long. The inlet 110, outlet 114, first and second pass throughs 212, 214, and first and second pairs of flow inducers 226, 228 are made from four- to six-inch diameter pipe, and the first and second ascending-flow vaults 220, 224 and the first and second descending-flow vaults 218, 222 are made from 12- to 15-inch diameter pipe.

According to an embodiment, many of the components of the septic tank 200 are cylindrical and made from plastic pipe, such as ABS or PVC, etc. In part, this is because such pipe is inexpensive and very widely available in many standard diameters. However, other embodiments are envisioned in which elements such as vaults, flow inducers, pass-throughs, couplers, etc., are made from other materials and/or have other shapes in transverse section, such as ovoid, rectangular, hexagonal, etc. Further embodiments are envisioned in which the numbers of elements vary from the disclosed embodiment. For example, according to an embodiment, a septic tank is provided that includes a first pair of descending-flow vaults in the second compartment 208, plumbed in parallel and configured to function substantially as described below with reference to the first descending flow vault 218, and a first pair of ascending-flow vaults positioned in the second compartment, plumbed in parallel and configured to function substantially as described below with reference to the first ascending flow vault 220 and second pairs of each in the third compartment. According to one embodiment, this arrangement is in a larger septic tank that is configured to operate at a greater capacity than the tank of the embodiment of FIG. 2. According to another embodiment, the vaults are made from smaller-diameter material, with the additional vaults provided to maintain a desired capacity.

According to an embodiment, the septic tank 200 and some or all of its components are manufactured as a single unitary element, and the shapes, sizes, and positions of the various vaults, flow inducers, etc., are selected at least in part to minimize manufacturing steps, complexity, and/or material costs.

Operation of the septic tank 200 will be described primarily with reference to FIG. 3, which is a diagrammatic representation of the septic tank 200, shown in a side sectional view, illustrating fluid flow through the tank, according to an embodiment. Each of the descending-flow vaults 218, 222 is shown with a respective flow inducer 226, 228 coupled thereto and lying in a same plane with the vaults, to simplify the description. In addition to the elements described with reference to FIG. 2, in the embodiment of FIG. 3, the pass-through baffle 216 includes a screen filter 232 configured to prevent the passage of most of the solids into the second compartment 208, and a second filter 234 is positioned inside the first ascending-flow vault 220. The tank 200 is also shown to include a cover or cap 236 with an air vent 238. In physical embodiments the air vent 238 can be integral with the cover 236, a separate element, or can be incorporated into an access port provided for inspection or cleaning. According to an embodiment, the septic tank 200 includes two or more air vents 238 to improve circulation of air. According to a further embodiment, the air vent 238 includes a small fan configured to circulate air through the headspace 240 of the septic tank 200.

In operation, wastewater influent enters the tank 200 via the inlet 110 and the inlet baffle 112. The wastewater exits the inlet baffle 112 in a mid-depth region of the first compartment 206 where it begins to settle and separate to form the sludge and scum layers 120, 122. The wastewater is oxygenated as it passes through the sewer pipes and enters the inlet 110, so growth of aerobic bacteria is supported and feeds on many of the organic components of the wastewater stream, producing various byproducts, including free nitrogen. As the wastewater is nitrogenated and the oxygen consumed, activity of aerobic bacteria slows and anaerobic bacteria becomes more active, continuing to feed on organics and denitrogenating the wastewater. As influent continues to enter the first compartment 206, fluid from the first compartment passes through the screen filter 232 and into the pass-through baffle 216, where the flow rises toward the fluid surface level 119 as it passes through the first pass through 212 into the second compartment 208. While flowing through the first pass through 212, the wastewater is reoxygenated by contact with the air in the headspace 240, which restarts the activity of aerobic bacteria. As the fluid exits the first pass through 212, it flows into the first descending-flow vault 218 and descends to the bottom of the vault before passing into the first flow inducer 226 via coupler 227a, where it begins to flow upward again. During the passage of wastewater downward through the first descending-flow vault 218 and upward in the first flow inducer 226, the aerobic bacteria in the fluid again consumes most of the available oxygen and slows activity while the anaerobic bacteria becomes more active, as the wastewater passes through a second nitrogenation-denitrogenation cycle.

The top edge 227a of the first flow inducer 226 is positioned near the fluid surface level 119 in the second compartment 210, so that the wastewater is reoxygenated by contact with the air in the headspace 240 of the tank 200, as it flows out of the top 227a of the first flow inducer and before it begins to descend in the main volume of the second compartment 208. The reoxygenation at the top 227a of the flow inducer 226 initiates a third nitrogenation-denitrogenation cycle as the fluid descends within the main volume of the second compartment 208, enters the first ascending-flow vault 220 at flow inlet 230a and rises again in that vault to the fluid surface level 119.

While rising in the first ascending-flow vault 220, the flow of wastewater passes through the second filter 234. According to one embodiment, this filter is a fine particulate filter configured to remove most of the particulates that remain in the wastewater at this stage. According to another embodiment, the second filter 254 is configured as a biofilter configured to support and promote the activity of microorganisms selected to extract general or specific contaminants in the wastewater.

Fluid exits the first ascending-flow vault 220 and passes into the second descending-flow vault 222 via the second pass through 214, descends in the second descending-flow vault until it passes into one the second flow inducer 228 and ascends again toward the top 229b of the second flow inducer, near the fluid surface level 119, before descending again, in the main volume of the third compartment 210. Near the bottom of the third compartment 210 the fluid enters the second ascending-flow vault 224 via flow inlet 230b and rises back to the surface level 119 before it finally exits the septic tank via the outlet 114.

Each time the flow of wastewater returns to the fluid surface level 119 it is reoxygenated and a new nitrification-denitrification cycle is initiated. Each time a new cycle is performed, more of the suspended solids are digested, more harmful microorganisms are suppressed and eliminated, and the wastewater is further purified. In the embodiments described above, fluid entering the tank 200 passes through five complete cycles before exiting the tank, as compared to the single cycle, or sometimes two cycles that occur in most conventional septic tanks.

It should be noted that the fluid surface level 119 can vary at different locations within the septic tank 200. For example, referring to FIG. 3, and assuming a flow rate at the inlet 110 that is sufficient to exceed a rate of evaporation within the tank 200, the lowest, or minimum fluid surface level 119a within the septic tank 200 is established by the height of the outlet 114 (absent any higher obstruction downstream of the outlet). However, if the top ends 229b of the second pair of flow inducers 228 are positioned above the fluid surface level 119a within the third compartment 212, this will establish a higher minimum fluid surface level 119b upstream of that location, i.e., within the second descending-flow vault 222 and the first and second compartments 206, 208. Similarly, if the top ends 229a of the first pair of flow inducers 226 are positioned above the fluid surface level 119b within the second compartment 210, this will establish a higher minimum fluid surface level 119c upstream of that location, i.e., within the first descending-flow vault 218 and the first compartment 206. Thus, anywhere the flow of wastewater within the tank 200 passes through a passage with a threshold that is higher than the downstream fluid surface level, the minimum fluid surface level upstream from that point will be established by that higher level.

The volume of the septic tank 200 and the sizes of the components are selected on the basis of the anticipated volume of wastewater it will be required to treat, and during normal operation at a nominal input volume, the passage of fluid through the system is preferably relatively slow, in order to permit and promote effective settling in the various compartments of the tank.

The area of a transverse section of a flow enclosure, i.e., vault, flow inducer, pass-through, compartment, etc. (hereafter, passage), refers to a cross-sectional area of the element in question as viewed in a plane that lies transverse to a primary direction of fluid flow, i.e., from an inlet to an outlet of that element. Flow rate refers to the volume of fluid flow per unit of area of the transverse section of a passage, e.g., per square inch of area, etc. Assuming a steady flow of influent at the inlet 110, the net volume of fluid passing downstream through any transverse section within the septic tank 200 will obviously be equal to the volume through any other transverse section, as well as to the volume of the influent and the effluent. However, the flow rate of the fluid will vary at different locations in the septic tank 200, based principally on the relative area of the transverse section of the passage at those locations.

The fluid flow rate will be highest inside the passages with the smallest transverse sectional areas, and lowest in the passages with the largest areas. In the septic tank 200, described above, the elements with the smallest transverse sectional areas are the inlet and outlet 110, 114 and the first and second pass throughs 212, 214. Even though the flow inducers 226, 228 may have a diameter that is similar or identical to that of the pass throughs, they are arranged in parallel-plumbed pairs, in this embodiment, with the fluid flow being divided between the two flow inducers of each pair. Each pair of flow inducers 226, 228 can therefore be treated as an equivalent single flow inducer with an effective transverse sectional area equal to a sum of the area of the respective pair. This results in the flow rate in each pair of flow inducers being half what the rate would be in an embodiment with single flow inducers of the same diameter.

Furthermore, because the inlet 110 and first and second pass throughs 212, 214 are horizontal passages that are largely positioned above the fluid surface level 119, fluid does not normally completely fill these elements, which reduces their effective transverse sectional areas and further increases their flow rate. A high flow rate within these passages encourages agitation and turbulence in the fluid, which in turn promotes effective oxygenation as the fluid passes through.

At the opposite end of the scale, the passage with the largest transverse sectional area is the first compartment 206, followed by the second and third compartments 208, 210—unlike the second and third compartments, the transverse sectional area of the first compartment is not reduced by the presence therein of vaults and flow inducers. The large transverse sectional areas of the compartments result in very slow fluid movement, particularly in the first compartment, which promotes settling and separation of the solids from the fluid.

The varying flow rates may have another effect on the bacterial activity in the wastewater: It will be noted, for example, based on the relative dimensions of the different elements of the embodiments described above, that the flow rate is slowest in the first compartment 206, followed by the flow rates in the second and third compartments 208, 210, then the ascending and descending vaults 220, 224, 218, 222, then the flow inducers 226, 228 and couplers 227, and finally, the flow rate is fastest in the inlet 110, outlet 114, and pass throughs 212, 214. More specifically, it can be seen that because of these varying flow rates, the first nitrification/denitrification cycle, which occurs in the fluid as it passes through the first compartment, is a relatively long cycle, followed by a relatively short cycle as the fluid descends in the first descending-flow vault and ascends in the first pair of flow inducers 226, then another long cycle as the fluid descends in the second compartment 208 and ascends in the first ascending vault 220, followed by another short cycle in the second descending-fluid vault and the second pair of flow inducers, and finally another long cycle in the second compartment 208 and the first ascending vault 220. The longer cycles will be more likely to be complete, i.e., in which aerobic bacteria consume substantially all of the available oxygen during nitrification, and the subsequent denitrification activity of the anaerobic bacteria is permitted to continue for as long as the chemistry in the fluid remains beneficial to that bacterial. In contrast, the shorter cycles may be more likely to be interrupted by the reoxygenation of the fluid at the beginning of the next cycle, as it moves more quickly through those portions of the system, meaning that while the denitrification may wind down naturally before the end of each of the longer cycles, the denitrification may be cut short at the ends of some of the shorter cycles, when the fluid is reoxygenated. According to an embodiment, the relative dimensions of the compartments and the various tank components are selected so as to regulate the relative lengths of some or all of the nitrification-denitrification cycles and provide an effluent with a desired level of wastewater treatment.

The embodiments described above can be categorized as passive oxygenation (PO) tanks, in which the wastewater absorbs oxygen merely from contact with ambient air as it flows through the system. In such systems, oxygenation levels can be selected, to a degree, in the design phase of the system by varying the length, diameter, and/or shape of each of the pass throughs 212, 214, and by providing a selected degree of ventilation in the headspace. Other embodiments will be described below, in which oxygenation and other secondary treatment processes are actively promoted through the use of pumps, filters, etc.

Typically, a septic tank design is selected to have a capacity that is sufficient to meet the needs of its intended application, with some margin to accommodate unexpected circumstances. Most often, this is merely a matter of appropriately dimensioning a PO tank and its components. Embodiments are also contemplated in which tanks are provided having fewer or more compartments than in the examples disclosed above. For example, according to an embodiment, a lower capacity tank is provided, having only two compartments, but otherwise configured as described with reference to FIGS. 2 and 3, with the first ascending-fluid vault 220 coupled directly to the tank outlet 114. According to other embodiments, septic tanks are provided that include four or more compartments, to meet greater anticipated capacity requirements.

However, it is not uncommon for a PO septic tank to be inadequate to meet its current or anticipated demands. This can be for any of a number of reasons. For example, in some cases, an intended location site cannot accommodate a PO tank with the required capacity; in other cases, the influent contains components, such as, e.g., some soluble VOCs, that cannot be adequately treated in a PO tank; in still other cases, remodeling or new construction results in an increased production of wastewater that exceeds the capacity of an existing system; and in some cases, a previously adequate system becomes inadequate because of changes in the local environment or changes in local regulations. For any of these reasons, it may become necessary to employ secondary treatment processes to broaden or increase the capacity of a system over a comparably configured PO system.

Figure 3:
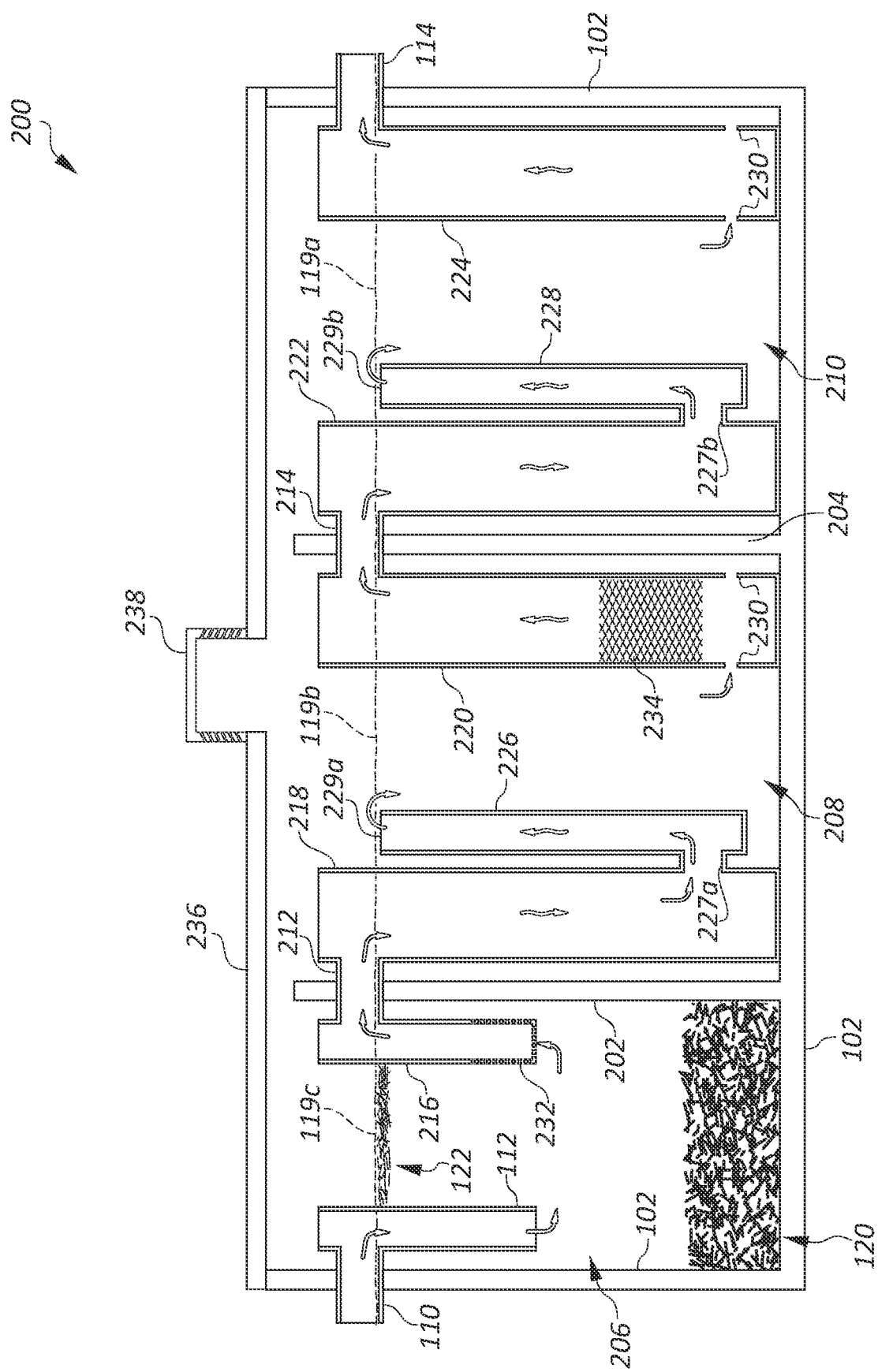
FIG. 3 is a diagrammatic representation of the septic tank of FIG. 2, shown in a side sectional view and illustrating a fluid flow path through the tank, according to an embodiment.
Figure 4:
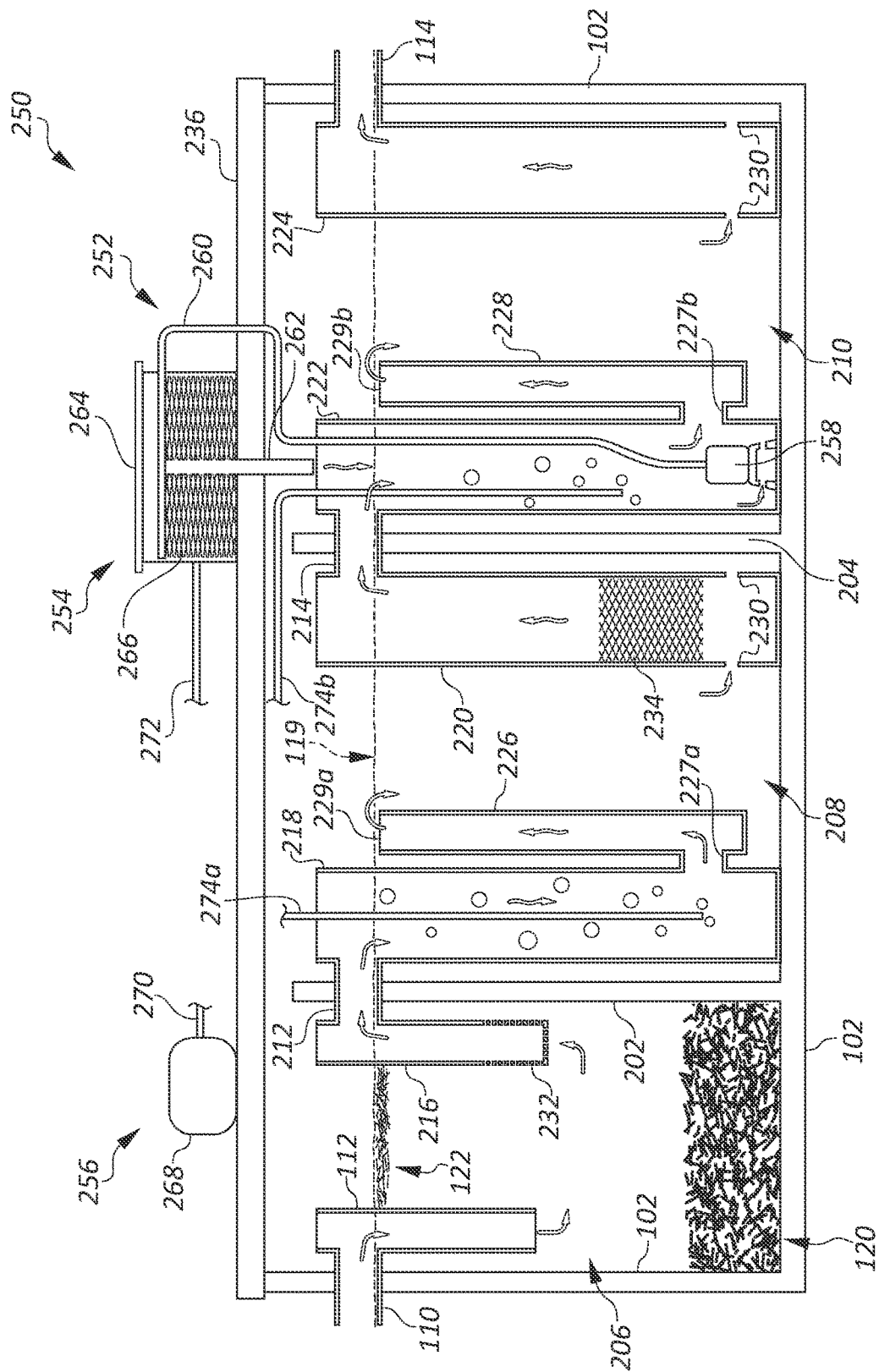
FIG. 4 is a diagrammatic representation of a septic tank, according to another embodiment, shown in a side sectional view that is similar to the view in FIG. 3 of the septic tank of FIGS. 2 and 3.

FIG. 4 is a diagrammatic representation of a septic tank 250, according to another embodiment, shown in a side sectional view that is similar to the view of the septic tank 200 of FIG. 3. The septic tank 250 is similar in most respects to the septic tank 200 of FIGS. 2 and 3. However, in addition to elements previously described the septic tank 250 includes a fluid recirculation system 252, a filtration system 254, and an aeration system 256.

The fluid recirculation system 252 includes a recirculation pump 258 positioned at the bottom of the second descending-fluid vault 222 in the third compartment 210, a fluid transmission line 260 coupled to the recirculation pump, and a fluid outlet port 262 operatively coupled to the fluid transmission line and positioned in or above the upper end of the second descending-fluid vault 222 to deliver recirculated fluid into the top of the second descending-fluid vault. The filtration system 254 includes a filter riser 264 and filter media 266. The filtration system 254 is configured to filter fluid passing through the recirculation system 252 before the fluid is reintroduced into the second descending-fluid vault 222. The aeration system 256 includes an air pump 268, an air outlet 270 and one or more air input and/or delivery lines 272, 274 operatively coupled to the air outlet.

Most embodiments will not include every element of every system shown or described herein. Instead, a system designer will select the elements according to the requirements of a particular application. For example, the fluid recirculation system 252 can be configured as a stand-alone system that simply recirculates fluid, without additional treatment, although in that case, it will typically be configured to recirculate wastewater further upstream, such as from the third to the second compartments, etc. However, when fluid is raised above the fluid surface level 119 for filtration, a fluid pump is generally a required element. In practice, therefore, a filtration system of the type described here typically incorporates a fluid recirculation system therewith, as in the present case. Additionally, depending upon the desired type of filtration, a supply of air may be required, in which case an aeration system may be incorporated, as well.

According to an embodiment, the filtration system 254 is configured as a biofilter of a type sometimes referred to as a suspended-growth filter, in which the filter media is configured to support live microorganisms that digest various types of contaminants from wastewater circulating through the filter. Depending upon the specific design and intended purpose, the filter media can be any of a number of types and materials, such as, e.g., sand, textile, plastic, etc. The fluid transmission line 260 delivers fluid from the recirculation pump 258 to the filter riser 264. The fluid is distributed over the filter media 266 and the treated fluid returns to the second descending-fluid vault 222 via the outlet port 262. Depending upon the types and expected levels of activity of the microorganisms in the biofilter 254, the system may require an oxygen source, in which case, an air input line 272 can be incorporated and configured to deliver air from the air pump 268 to the filter media 266.

According to various embodiments, the recirculation pump 258 is configured to operate continually, or for a short time at regular intervals. For example, in one embodiment, the pump 258 operates once every hour for about three to ten minutes. According to another embodiment, effluent from the outlet 114 is tested periodically, and the rate and duty cycle of the recirculation pump 258 is controlled or adjusted to keep the water quality of the effluent within a selected range.

According to another embodiment, the aeration system 256 is configured to improve oxygenation of the wastewater at selected locations in the tank 250, and one or more air delivery lines 274 are therefor provided at selected locations and depths. Two air delivery lines 274 are shown in the embodiment of FIG. 4 by way of example, only. An air delivery line 274a is positioned to deliver a stream of air to the lower portion of the first descending-fluid vault 218, while another air delivery line 274b is positioned to deliver a stream of air to the lower portion of the second descending-fluid vault 222. This can be in conjunction with a filter return, as shown here, or as a stand-alone element. Air rising from an air delivery line 274 significantly increases the level of oxygenation in the fluid, boosting the activity of aerobic organisms in the wastewater.

While air delivery lines 274 are shown in the first and second descending-fluid vaults 218, 222, a designer may choose to place an air delivery lane at any location where it is desirable to boost aerobic activity in the wastewater stream. For example, fluid in the first ascending-fluid vault 220 enters the vault after a relatively long period in the main volume of the second compartment 208. Accordingly, by the time the fluid enters the vault, most of the free oxygen will have been consumed, and the level of oxygen-based bioactivity will have dropped off. If configured as a biofilter, the second filter 234 is therefore appropriately positioned in the first ascending-fluid vault 220 to support the growth and activity of anaerobic microorganisms. However, in some cases, the overall system performance may be better served by encouraging further aerobic activity at this location. According to an embodiment, an air delivery line 274 is therefore positioned in the first ascending-fluid vault 220 and configured to deliver a stream of air from the air pump 256 to the second filter 234 to promote the growth and activity of aerobic microorganisms in the filter. Likewise, according to other embodiments, the fluid recirculation and filtration systems 252, 254 are configured to draw fluid from other locations than that shown, and/or to deliver the recirculated, filtered fluid to other locations in the tank 250.

The embodiments disclosed above provide a number of significant advantages over the known art, examples of which include the following. Passive reoxygenation of the fluid is accomplished with a minimum of additional agitation. For example, fluid is reoxygenated as it enters the first and second descending-flow vaults 218, 222 without significantly disturbing fluid within the second or third compartments 208, 210. The fluid is again reoxygenated as it is introduced into the main volumes of the second and third compartments 208, 210 from the flow inducers 226, 228, with minimal agitation, at or near the fluid surface level 119, so that the fluid descends the entire depth of the second and third compartments, increasing the effective passage length and therefore the dwell time within the compartments, as compared with many conventional septic tank systems. As previously noted with reference to the prior art system of FIG. 1, the inventor has recognized that in prior art systems, fluid recirculation can increase the flow of fluid through portions of the system, and that the increased flow disrupts the settling and separation action, particularly in the first compartment where most of the separation occurs. A particular advantage of embodiments disclosed herein with reference to FIG. 4, is that fluid for recirculation is drawn from the second descending-fluid vault 222, then the filtered and re-aerated fluid is returned to the same descending-fluid vault, so that all of the increased flow arising from the recirculation occurs only in the second descending-fluid vault. Thus, the recirculation has no effect on the rate of flow through the first compartment 206 or through the main volumes of either the second or third compartments 208, 210. Even in embodiments in which fluid is recirculated from, for example, a vault in the third compartment 208 to a vault in the second compartment 210, this can be done without introducing any additional fluid flow or agitation to the first compartment 206.

Additionally, where most conventional systems provide a passage between the first and second compartments at a depth that permits fluid from the clear layer in the first compartment to pass directly to the second compartment (see, e.g., the center passage 118 of FIG. 1), in the embodiments described above, fluid passes into the pass-through baffle 216 at a lower depth but rises to the fluid surface level 119 before passing into the second compartment via the pass-through 212. One result of this is that drops in the fluid surface level 119 that might occur in the second compartment 208, because of, for example, the action of pumps or other secondary treatment systems, will have no effect on the fluid surface level in the first compartment 206. In a conventional system, in contrast, a drop in the fluid surface level in the second compartment would cause a surge of fluid through the center passage to balance the level across the entire tank. The structure disclosed herein serves to isolate each compartment from such level changes in down-stream compartments.

Another advantage associated with the configuration of the secondary systems shown in FIG. 4, in which the recirculation pump 258 and the air delivery line 274*b* are positioned in the second descending-fluid vault 222 and recirculated fluid is returned to the same vault, is that a single access riser can be provided to enable service for all of these elements, and the filter riser 264 can also be incorporated as part of the access riser, as well. It will be understood that any active element incorporated into a septic tank, such as pumps, filters, air lines, etc., may require service or cleaning over the course of the tank's service life. By grouping such elements together, the number of necessary access risers can be reduced, along with associated costs and complications.

Figure 5:
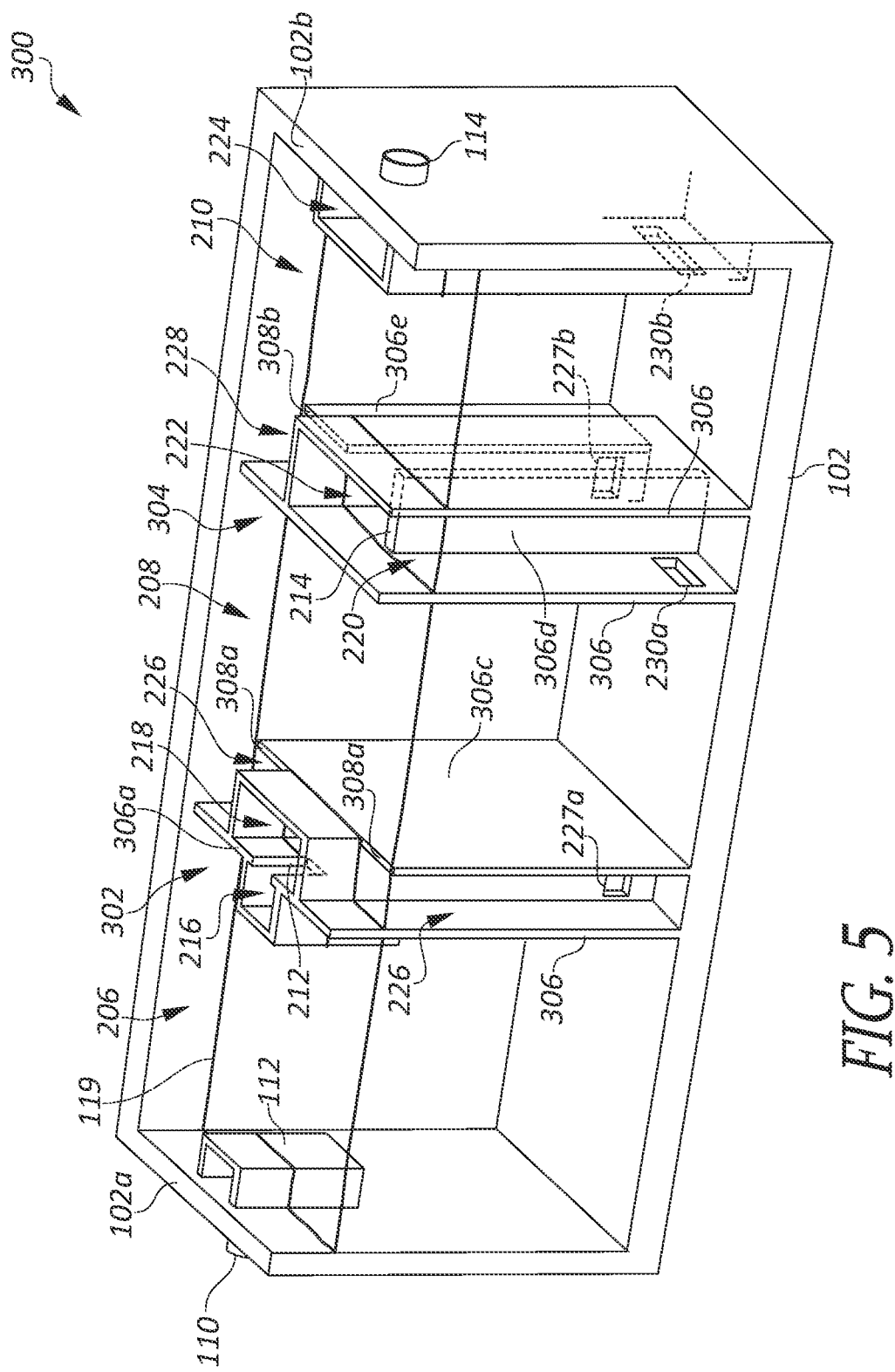

FIG. 5 is a perspective view of a septic tank system 300 according to an embodiment, with the top and one side omitted or cut away to show the interior of the tank. In the embodiment of FIG. 5, the septic tank 300 has a unitary form, in which many or all of the components are fabricated as a single unit, or as a plurality of sub-combination inserts, etc. This can be, for example, by an appropriate plastic molding process or as precast concrete, etc.

The embodiment of FIG. 5 is disclosed, in part, to show an embodiment in which pluralities of individual components are manufactured together as sub-combinations, or in which the entire septic tank 300 is manufactured as a single element. Nevertheless, in general, components of the septic tank 300 are functionally similar or identical to corresponding components of the septic tank 200 described above with reference to FIGS. 2 and 3. Accordingly, the same reference numbers are used to identify components that are functionally substantially similar. Because the operation of the septic tank 300 corresponds generally to that of the septic tank 200, it will not be described in detail, except where the different structure results in variations in the manner of operation.

The septic tank 300 includes bottom, side, and end walls 102, an inlet 110 and inlet baffle 112, and an outlet 114. The septic tank 300 includes first, second, and third compartments 206, 208, 210 that are separated by a first component group 302 positioned between the first and second compartments, and a second component group 304 positioned between the second and third compartments. The individual components of the first and second component groups 302, 304 are defined primarily by vertical walls 306.

The first component group 302 includes a pass throughbaffle 216, positioned or extending into in the first compartment 206, which is in fluid communication with a first descending-flow vault 218 via a first pass through 212 defined by a notch in a vertical wall 306*a*. the first descending-flow vault 218 is operatively coupled to a first pair of flow inducers 226 via couplers 227*a* extending through vertical walls 306*b*. Each of the first pair of flow inducers 226 includes a flow inducer outlet 308*a* defined by the upper rim of a respective portion of a vertical wall 306*c* positioned at a height corresponding to the fluid surface level 119.

The second component group 304 includes a flow inlet 230 positioned at or near the bottom of a first ascending-flow vault 220. A second pass through 214 operatively couples the first ascending-flow vault 220 with a second descending-flow vault 222. The second pass through 214 is defined by an upper edge of a vertical wall 306*d* at a height that corresponds to the fluid surface level 119. A coupler 227*b* near the bottom of the second descending-flow vault 222 places the second descending-flow vault in fluid communication with a second flow inducer 228. An outlet 308*b* of the second flow inducer 228 is defined by an upper edge of a vertical wall 306*e*.

A second ascending-flow vault 224 includes a flow inlet 230 positioned at or near the bottom thereof, and is also coupled to an inner end of the outlet 114. According to an embodiment, the second ascending-flow vault 224 and/or the inlet baffle 112 are formed integrally with the end walls 102*a*, 102*b* of the septic tank 300. According to another embodiment, the second ascending-flow vault 224 and/or the inlet baffle 112 are formed separately, then attached to the respective end walls 102, using, for example, adhesive, mechanical fasteners, etc. Similarly, in embodiments in which the first and/or second component groups 302, 304 are formed separately from the outer walls 302 of the tank 300, the component groups can be affixed in the tank using any appropriate fastening method, including cement or adhesive, mechanical fasteners, etc.

The transverse sectional areas of many of the individual components of the first and second component groups 302, 304 can be established by selection of the positions of the vertical walls 306. While not shown in FIG. 5, embodiments are contemplated in which features and elements shown and described with reference to the septic tanks 200 of FIG. 2, and 250 of FIG. 4, are incorporated into a septic tank similar to that described with reference to FIG. 5. According to another embodiment, components or component groups are integrated into the side walls of the tank, rather than extending across the tank, as in the embodiment described with reference to FIG. 5.

According to an embodiment, one or more vaults are positioned outside the walls of a septic tank but are configured to function as described above, with vault inlets and/or outlets extending through the walls of the tank, operatively coupling them with compartments of the tank and with other components positioned in the tank.

According to another embodiment, a septic system is provided that comprises a tank with a one or more compartments, but that also includes a second tank with one or more additional compartments, with corresponding vaults and flow inducers positioned therein, and with an outlet of the first tank being coupled with an inlet of the second tank. This embodiment is contemplated for use, for example, in cases where an existing conventional one- or two-compartment septic tank is retrofitted in accordance with principles of the invention, and the one or more additional compartments of the second tank are provided to increase the capacity or efficiency of the existing septic system.

A particularly beneficial feature provided by various embodiments is the provision of multiple serial passages, i.e., the various vaults, flow inducers, compartments, etc., which carry the wastewater through repeated nitrogenation-denitrogenation cycles within the limited space of a septic tank, which results in significantly better and more complete wastewater treatment as compared with most conventional systems of comparable size. This is demonstrated by tests conducted by the inventor, which have confirmed the effectiveness of the principles disclosed herein.

For purposes of context and comparison, reference is made again to the wastewater treatment regulations of the State of Washington (Washington Administration Code 246-272A-0110), as of the filing date of the present disclosure, which are representative of the standards of many municipalities in the U.S. and Canada. Table 1 shows the performance levels required to qualify a proprietary sewage treatment system under levels A-E in Category 1 (systems "designed to treat sewage with strength typical of a residential source . . . ").

TABLE 1

| | Parameters | | | |
|---|---|---|---|---|
| Level | BOD[1] | TSS[2] | O&G[3] | FC[4] |
| A | 10 mg/L | 10 mg/L | — | 200/100 ml |
| B | 15 mg/L | 15 mg/L | — | 1,000/100 ml |
| C | 25 mg/L | 30 mg/L | — | 50,000/100 ml |
| D | 25 mg/L | 30 mg/L | — | — |
| E | 125 mg/L | 80 mg/L | 20 mg/L | — |

([1]Biochemical oxygen demand; [2]total suspended solids; [3]oil & grease; [4]colonies of fecal coliform bacteria).

In the inventor's experience, currently available septic waste treatment systems that are capable of meeting any of Levels A-D performance standards are expensive and complex, requiring secondary treatment of the effluent, beyond the biological processes supported by known septic tank systems. Such secondary treatment methods can include, for example, UV treatment, chemical treatment, sand bed filters, etc.

UV treatment generally comprises a module configured to expose the effluent from a septic tank to UV light to kill fecal coliform bacteria. However, such modules are often subject to damage to the electrical connections by encroaching moisture, and UV bulbs require regular replacement, so frequent maintenance is usually necessary. Other factors that can limit the effectiveness of UV treatment include increases in flow rate, fouling, such as when a UV bulb becomes coated with sludge, and turbidity, which is directly related to TSS in the fluid. Each of these factors can reduce the exposure of the wastewater to the UV light, by reducing either the time or the intensity of the exposure, thereby degrading the performance of a UV treatment system. A slight reduction in exposure can result in a significant increase in FC.

Chemical treatment of the effluent, such as by the addition of chlorine, involves the addition of measured amounts of chlorine to the effluent to kill fecal coliform bacteria. However, such systems require regular service to replenish the chemical supply, and the concentration of chlorine in the wastewater must be carefully regulated to prevent damage to microorganisms in drainfields, or groundwater contamination.

A sand bed filter typically includes a pump enclosure and a covered box filled with layers of sand and gravel. Wastewater is distributed over the media and allowed to penetrate through to the bottom, where it is then pumped on to a drainfield or additional treatment system. Sand bed filters typically support further biological activity in the wastewater and remove particulates.

While secondary treatment systems can significantly increase the cost of a septic treatment system, each of the secondary treatment processes described above also increases the area requirements of a septic treatment system, so there is not always space available to accommodate such systems.

Finally, in practice, the inventor has found that for known systems that are nominally rated as meeting one of Levels A-C, in practice their performance rarely meets even one of the parameter standards, let alone all three.

In the inventor's test system, a septic system was provided that included a septic tank substantially similar to the septic tank 200 described with reference to FIGS. 2 and 3. The strength of the influent was equal to or greater than a strength typical of a residential source over the length of the testing period. The strength of the effluent was monitored periodically during the test period.

The test tank was first operated for a number of months as a passively oxygenated system, similar to that described with reference to FIGS. 2 and 3. The inventor then installed an air supply line located in a position corresponding to the position of the air delivery line 274a, in the first descending-fluid vault 218, as shown in FIG. 4. The values set forth below were collected periodically following the installation of the air supply line. Table 2 provides the values of various parameters and indicates the approximate time at which those values were obtained relative to the installation of the air supply line.

TABLE 2

| Time | BOD | TSS | FC |
|---|---|---|---|
| Second Month | 74.4 | 28 | 13.75K |
| Third Month | 25.4 | 9 | 80K |
| Fourth Month | 9 | 5 | 16.4K |
| Fifth Month | 2.97 | 5 | 3.5K |

From this data, it can be seen that within the second month of operation with the air supply line, the test system would have qualified for use under Level E, in the third month the system was operating at the threshold of qualification for Level D, and by the fourth month, only the FC value exceeded the standard for qualification in Level A, and the FC value was still trending downward.

Following a period of operation with the air supply line, the inventor installed a recirculation system and biofilter, as shown and described with reference to FIG. 4. Table 3 provides the values collected over two months, beginning two months after the system was reconfigured.

TABLE 3

| Time | BOD | TSS | FC |
|---|---|---|---|
| 3 Months | 6.7 | 4.5 | 20 |
| 4 Months | 3.0 | 1.8 | <1 |

As shown in Table 3, in both sample months, all of the parameters were within the limits defined under Level A. These results are particularly surprising because, as noted above, the inventor is not aware of any known septic tank system that is capable of performing even to the standards of Level D without secondary treatment of the effluent, while at least the embodiment of FIG. 4 comfortably meets the standards of Level A.

The inventor believes that by application of the principles disclosed above, working embodiments can be designed that will meet the most rigorous standards in current use, while avoiding the need for expensive and complex secondary treatment systems that are currently necessary where very high-quality treatment is required.

Although several embodiments are disclosed herein, other embodiments are contemplated in which some features are eliminated or combined with other embodiments, or in which various other features are incorporated that are known in the art but not described herein. Additionally, embodiments are contemplated in which the arrangement of the components are varied from those shown or described above.

Ordinal numbers, e.g., first, second, third, etc., are used in the claims according to conventional claim practice, i.e., for the purpose of clearly distinguishing between claimed elements or features thereof, etc. (hereafter, elements), without imposing specific additional limitations on those elements. Ordinal numbers may be assigned arbitrarily, or in the order in which the numbered elements are introduced, etc. The use of such numbers, alone, does not suggest any other relationship, such as order of operation, relative position of such elements, etc. Furthermore, an ordinal number used to refer to an element in a claim should not be assumed to correlate to a number used in the specification to refer to an element of a disclosed embodiment on which that claim reads, nor to numbers used in unrelated claims to designate similar elements or features.

In the drawings, some elements are designated with a reference number followed by a letter, e.g., "274a, 274b." In such cases, the letter designation is used where it may be useful in the corresponding description to differentiate between or to refer to specific ones of a number of otherwise similar or identical elements. Where the description omits the letter from a reference, and refers to such elements by number only, this can be understood as a general reference to any or all of the elements identified by that reference number, unless other distinguishing language is used.

The abstract of the present disclosure is provided as a brief outline of some of the principles of the invention according to one embodiment, but is not intended as a complete or definitive description of any single embodiment thereof, nor should it be relied upon to define terms used in the specification or claims. The abstract does not limit the scope of the claims.

It will be understood that the scope of the appended claims should not be limited by particular embodiments set forth herein, but should be construed in a manner consistent with the specification as a whole.

What is claimed is:

1. A septic system, comprising:
    a septic tank having a plurality of compartments, a first one of the plurality of compartments having a tank inlet, the first compartment and the tank inlet being configured to receive untreated wastewater;
    a first vault positioned and configured to receive fluid from the first compartment at a level corresponding to a fluid surface level in the first compartment;
    a first flow inducer positioned and configured to receive fluid from the first vault at a level near a bottom of the first vault and to release fluid into a second one of the plurality of compartments at a level near a fluid surface level in the second first compartment; and
    a second vault positioned and configured to receive fluid from the second compartment at a level near a bottom of the second vault and to discharge fluid at a level corresponding to a fluid surface level in the second compartment.

2. The septic system of claim 1, wherein the first flow inducer comprises a plurality of flow inducer elements, each positioned and configured to receive fluid from the first vault at a level near the bottom of the first vault and to release fluid into the second compartment at a level near the fluid surface level in the second compartment.

3. The septic system of claim 1, comprising an aeration system configured to deliver air to at least one of the first and second vaults.

4. The septic system of claim 1, wherein the second vault is configured to discharge fluid to a third one of the plurality of compartments.

5. The septic system of claim 4, comprising a third vault positioned and configured to receive fluid from the second vault at a level corresponding to the fluid surface level in the second compartment;
    a second flow inducer positioned and configured to receive fluid from the third vault at a level near a bottom of the third vault and to release fluid into the third one of the plurality of compartments at a level near a fluid surface level in the third compartment; and
    a fourth vault positioned and configured to receive fluid from the third compartment at a level near a bottom of the fourth vault and to discharge fluid at a level corresponding to a fluid surface level in the third compartment.

6. The septic system of claim 5, wherein the fourth vault is configured to discharge fluid via a tank outlet.

7. The septic system of claim 5, comprising a fluid recirculation system configured to move fluid from a first location in the septic system to a second location, upstream from the first location.

8. The septic system of claim 7, wherein the fluid recirculation system is configured to move fluid from a position near the bottom of the third vault to the third vault at a position near a fluid surface level in the third vault.

9. The septic system of claim 7, comprising a filtration system configured to receive fluid from the recirculation system and to discharge fluid at the second location.

10. The septic system of claim 9, wherein the filtration system comprises a biofilter.

11. The septic system of claim 10, comprising an aeration system configured to deliver air to the biofilter.

12. The septic system of claim 1, comprising a filter positioned within the second vault.

13. The septic system of claim 1, wherein an outlet of the first flow inducer is positioned to release fluid into the second one of the plurality of compartments at a level above the fluid surface level in the second compartment.

14. The septic system of claim 1, comprising a passage extending from the first compartment to the first vault, configured to encourage passive oxygenation of fluid passing therethrough from the first compartment to the first vault, and wherein the first flow inducer is configured to encourage passive oxygenation of fluid released into the second one of the plurality of compartments.

15. A septic system, comprising:
    a septic tank having a plurality of compartments, a first one of the plurality of compartments having a tank inlet;
    a first vault positioned and configured to receive fluid from the first compartment at a level corresponding to a fluid surface level in the first compartment;
    a first flow inducer positioned and configured to receive fluid from the first vault at a level near a bottom of the first vault and to release fluid into a second one of the plurality of compartments at a level corresponding to a fluid surface level in the second compartment; and
a second vault positioned and configured to receive fluid from the second compartment at a level near a bottom of the second vault and to discharge fluid at a level corresponding to a fluid surface level in the second compartment; and
wherein the first vault, the first flow inducer, and the second vault are positioned within the second compartment.

16. A septic system, comprising:
a septic tank having first, second, and third compartments, the first compartment having a tank inlet and the third compartment having a tank outlet;
a first passage positioned in the second compartment and configured to receive fluid from the first compartment at a level near a fluid surface level in the first compartment;
a second passage positioned in the second compartment and configured to receive fluid from the first passage at a level near a bottom end of the first passage and to release fluid into a main volume of the second compartment at a level near a fluid surface level within the second compartment;
a third passage positioned in the second compartment and configured to receive fluid from the main volume of the second compartment near a bottom end of the third passage and to deliver fluid from the second compartment to the third compartment at a level near the fluid surface level within the second compartment;
a fourth passage positioned in the third compartment and configured to receive fluid from the third passage;
a fifth passage positioned in the third compartment and configured to receive fluid from the fourth passage at a level near a bottom end of the fourth passage and to release fluid into a main volume of the third compartment at a level near a fluid surface level within the third compartment; and
a sixth passage positioned in the third compartment and configured to receive fluid from the main volume of the third compartment near a bottom end of the sixth passage and to deliver fluid from the third compartment to the tank outlet at a level near the fluid surface level within the third compartment.

17. The septic system of claim 16, wherein each of the second and fifth passages comprises a respective plurality of passage elements.

18. The septic system of claim 16, comprising an aeration system configured to deliver air to at least one of the first and fourth passages.

19. A method of operation, comprising:
introducing untreated wastewater fluid into a first compartment of a septic tank;
introducing fluid from the first compartment into a first passage at a level near a fluid surface level in the first compartment;
introducing fluid from the first passage into a second passage at a level near a bottom of the first passage;
discharging fluid from the second passage into a main volume of a second compartment of the septic tank at a level near a fluid surface level in the second compartment;
introducing fluid into a third passage at a level near a bottom of the second compartment;
discharging fluid from the third passage at a level near the fluid surface level in the second compartment.

20. The method of claim 19, comprising:
receiving fluid from the third passage into a fourth passage;
introducing fluid from the fourth passage into a fifth passage at a level near a bottom of the fourth passage; and
discharging fluid from the fifth passage into a main volume of a third compartment of the septic tank at a level near a fluid surface level in the third compartment.

21. The method of claim 19, comprising:
recirculating fluid from a first location in the septic tank to a second location in the tank, upstream from the first location and downstream from the first compartment.

22. The method of claim 21, wherein the recirculating fluid comprises passing the fluid through a filter.

23. The method of claim 19, wherein:
the introducing untreated wastewater fluid into a first compartment of a septic tank includes initiating a first nitrogenation-denitrogenation cycle in the septic tank;
the introducing fluid from the first compartment into a first passage includes initiating a second nitrogenation-denitrogenation cycle in the septic tank; and
the discharging fluid from the second passage into a main volume of a second compartment includes initiating a third nitrogenation-denitrogenation cycle in the septic tank.

24. The method of claim 23, wherein the discharging fluid from the third passage at a level near the fluid surface level in the second compartment includes initiating a fourth nitrogenation-denitrogenation cycle in the septic tank.

25. The method of claim 19, wherein: the discharging fluid from the second passage into a main volume of a second compartment of the septic tank at a level near a fluid surface level in the second compartment includes discharging fluid from the second passage into the main volume of the second compartment at a level above the fluid surface level in the second compartment.

* * * * *